(12) United States Patent
Freeman

(10) Patent No.: US 7,790,824 B2
(45) Date of Patent: Sep. 7, 2010

(54) HIGH REFRACTIVE INDEX OPHTHALMIC DEVICE MATERIALS

(75) Inventor: Charles Freeman, Granbury, TX (US)

(73) Assignee: Alcon, Inc., Hunenberg (CH)

( * ) Notice: Subject to any disclaimer, the term of this patent is extended or adjusted under 35 U.S.C. 154(b) by 50 days.

(21) Appl. No.: 12/178,794

(22) Filed: Jul. 24, 2008

(65) Prior Publication Data

US 2009/0043006 A1 Feb. 12, 2009

Related U.S. Application Data

(60) Provisional application No. 60/951,865, filed on Jul. 25, 2007.

(51) Int. Cl.
*C08F 18/10* (2006.01)
*C08F 20/18* (2006.01)
*C08F 220/18* (2006.01)
*C08F 220/10* (2006.01)
*A61F 2/16* (2006.01)
*G02B 1/04* (2006.01)

(52) U.S. Cl. ............... 526/326; 526/319; 526/328.5; 526/329.1; 523/106; 623/6.11

(58) Field of Classification Search .......... 523/106, 523/107, 108; 351/160 H, 160 R; 526/326, 526/319, 329.1, 328.5; 623/6.11
See application file for complete search history.

(56) References Cited

U.S. PATENT DOCUMENTS

| | | | |
|---|---|---|---|
| 4,032,599 A | 6/1977 | Cordrey et al. | 260/885 |
| 4,280,970 A | 7/1981 | Kesting | 264/1.7 |
| 4,304,895 A | 12/1981 | Loshaek | 526/313 |
| 4,528,311 A | 7/1985 | Beard et al. | 524/91 |
| 4,780,488 A | 10/1988 | Su et al. | 523/106 |
| 4,834,750 A | 5/1989 | Gupta | 623/6 |
| 4,840,851 A | 6/1989 | Gölander et al. | 428/523 |
| 4,857,606 A | 8/1989 | Su et al. | 525/455 |
| 4,871,785 A | 10/1989 | Froix | 523/106 |
| 5,019,100 A | 5/1991 | Hennink et al. | 623/6 |
| 5,039,769 A | 8/1991 | Molock et al. | 526/301 |
| 5,070,166 A | 12/1991 | Su et al. | 526/301 |
| 5,070,169 A | 12/1991 | Robertson et al. | 528/25 |
| 5,070,170 A | 12/1991 | Robertson et al. | 528/25 |
| 5,077,033 A | 12/1991 | Viegas et al. | 514/668 |
| 5,147,394 A | 9/1992 | Siepser et al. | 623/6 |
| 5,275,838 A | 1/1994 | Merrill | 427/2 |
| 5,290,548 A | 3/1994 | Goldberg et al. | 424/78.18 |
| 5,290,892 A | 3/1994 | Namdaran et al. | 526/259 |
| 5,310,779 A | 5/1994 | Lai | 524/588 |
| 5,331,073 A | 7/1994 | Weinschenk, III et al. | 526/264 |
| 5,334,681 A | 8/1994 | Mueller et al. | 526/243 |
| 5,352,714 A | 10/1994 | Lai et al. | 523/107 |
| 5,359,021 A | 10/1994 | Weinschenk, III et al. | 526/264 |
| 5,403,901 A | 4/1995 | Namdaran et al. | 526/259 |
| 5,433,746 A | 7/1995 | Namdaran et al. | 623/6 |
| 5,470,932 A | 11/1995 | Jinkerson | 526/312 |
| 5,480,950 A | 1/1996 | Wang et al. | 526/258 |
| 5,583,191 A | 12/1996 | Kawai et al. | 526/320 |
| 5,618,316 A | 4/1997 | Hoffman et al. | 623/6 |
| H1666 H | 7/1997 | Stenger-Smith et al. | 522/3 |
| 5,645,882 A | 7/1997 | Llanos | 427/2.24 |
| 5,674,942 A | 10/1997 | Hill et al. | 525/131 |
| 5,674,960 A | 10/1997 | Namdaran et al. | 526/259 |
| 5,693,095 A | 12/1997 | Freeman et al. | 623/6 |
| 5,708,094 A | 1/1998 | Lai et al. | 525/296 |
| 5,717,049 A | 2/1998 | Liao et al. | 526/304 |
| 5,824,719 A | 10/1998 | Kunzler et al. | 523/106 |
| 5,861,031 A | 1/1999 | Namdaran et al. | 623/6 |
| 5,939,485 A | 8/1999 | Bromberg et al. | 524/556 |
| 6,140,438 A | 10/2000 | Ojio et al. | 526/264 |
| 6,160,030 A | 12/2000 | Chaouk et al. | 521/145 |
| 6,241,766 B1 | 6/2001 | Liao et al. | 623/6.56 |
| 6,255,360 B1 | 7/2001 | Domschke et al. | 521/64 |
| 6,281,319 B1 | 8/2001 | Mentak | 526/319 |
| 6,310,215 B1 | 10/2001 | Iwamoto | 548/365.4 |
| 6,326,448 B1 | 12/2001 | Ojio et al. | 526/259 |
| 6,329,485 B1 | 12/2001 | Vanderbilt | 526/318.1 |
| 6,353,069 B1 | 3/2002 | Freeman et al. | 526/319 |
| 6,388,035 B1 * | 5/2002 | LeBoeuf | 526/264 |
| 6,465,588 B1 * | 10/2002 | Li | 526/258 |
| 6,517,933 B1 | 2/2003 | Soane et al. | 428/221 |
| 6,528,602 B1 | 3/2003 | Freeman et al. | 526/259 |
| 6,534,559 B1 | 3/2003 | Vanderlaan et al. | 523/105 |
| 6,534,591 B2 | 3/2003 | Rhee et al. | 525/54.1 |
| 6,544,953 B2 * | 4/2003 | Tsuzuki et al. | 514/25 |
| 6,555,030 B1 | 4/2003 | Weinschenk, III | 264/1.7 |
| 6,585,768 B2 | 7/2003 | Hamano et al. | 623/6.37 |
| 6,635,731 B2 | 10/2003 | Mentak | 526/319 |
| 6,635,732 B2 | 10/2003 | Mentak | 526/319 |
| 6,653,420 B2 | 11/2003 | Domschke et al. | 526/258 |

(Continued)

FOREIGN PATENT DOCUMENTS

EP 0 297 686 6/1988

(Continued)

OTHER PUBLICATIONS

Pluronic® 25R4 Block Copolymer Surfactant Product Brochure, BASF Corporation, 2002.

*Primary Examiner*—Mark Eashoo
*Assistant Examiner*—Michael Pepitone
(74) *Attorney, Agent, or Firm*—Patrick M. Ryan

(57) ABSTRACT

High refractive index copolymers suitable for use in ophthalmic devices are disclosed. The copolymers comprise two or more aryl hydrophobic monomers and a non-polymerizable propylene oxide-ethylene oxide-propylene oxide block copolymer surfactant having a molecular weight of approximately 3600 and approximately 40% ethylene oxide units by weight. The copolymers have a reduced tendency to form glistenings when stored in water at physiological temperatures compared to similar copolymers lacking the non-polymerizable surfactant.

11 Claims, No Drawings

U.S. PATENT DOCUMENTS

| | | | |
|---|---|---|---|
| 6,653,422 B2 | 11/2003 | Freeman et al. | 526/259 |
| 6,653,731 B2 | 11/2003 | Kato et al. | 257/737 |
| 6,657,029 B2 | 12/2003 | Vanderbilt | 526/258 |
| 6,657,030 B2 | 12/2003 | Vanderbilt | 526/258 |
| 6,657,032 B2 | 12/2003 | Vanderbilt | 526/320 |
| 6,673,886 B2 | 1/2004 | Vanderbilt | 526/319 |
| 6,703,466 B1 | 3/2004 | Karakelle et al. | 526/259 |
| 6,713,583 B2 | 3/2004 | Liao et al. | 526/319 |
| 6,780,899 B2 | 8/2004 | Liao et al. | 523/106 |
| 6,806,337 B2 | 10/2004 | Schlueter et al. | 526/318.43 |
| 6,872,793 B1 | 3/2005 | Schlueter | 526/326 |
| 6,897,271 B1 | 5/2005 | Domschke et al. | 526/91 |
| 7,037,469 B2 | 5/2006 | Hu et al. | 422/28 |
| 7,176,256 B2 | 2/2007 | Rhee et al. | 525/54.1 |
| 7,247,270 B2 | 7/2007 | Hu et al. | 422/28 |
| 2001/0037150 A1 | 11/2001 | Chan et al. | |
| 2002/0004573 A1 | 1/2002 | Domschke et al. | 526/318.4 |
| 2002/0049290 A1* | 4/2002 | Vanderbilt | 526/264 |
| 2002/0082372 A1* | 6/2002 | Leboeuf | 526/227 |
| 2002/0137866 A1* | 9/2002 | LeBoeuf | 526/264 |
| 2003/0044468 A1 | 3/2003 | Cellesi et al. | 424/487 |
| 2003/0125498 A1 | 7/2003 | McCabe et al. | 528/25 |
| 2003/0162862 A1 | 8/2003 | McCabe et al. | 523/106 |
| 2003/0175503 A1* | 9/2003 | Lucast et al. | 428/343 |
| 2003/0187183 A1 | 10/2003 | Jiang | 528/494 |
| 2004/0019131 A1* | 1/2004 | Schlueter et al. | 523/106 |
| 2005/0131183 A1 | 6/2005 | Benz et al. | 526/319 |
| 2006/0134169 A1 | 6/2006 | Linhardt et al. | 424/427 |
| 2006/0205621 A1 | 9/2006 | Borazjani et al. | |
| 2006/0270749 A1 | 11/2006 | Salamone et al. | 522/188 |
| 2006/0275342 A1 | 12/2006 | Lindhardt et al. | 424/428 |
| 2007/0196329 A1 | 8/2007 | Xia et al. | |
| 2008/0139769 A1 | 6/2008 | Iwamoto et al. | 526/259 |
| 2009/0281209 A1 | 11/2009 | Lehman et al. | |

FOREIGN PATENT DOCUMENTS

| | | |
|---|---|---|
| EP | 0 330 615 | 2/1989 |
| EP | 0 330 616 | 2/1989 |
| EP | 0 765 733 | 4/1997 |
| EP | 0 395 583 B1 | 9/1997 |
| EP | 1 617 277 | 1/2006 |
| JP | 2006249381 A | 9/2006 |
| WO | WO 96/14887 | 5/1996 |
| WO | WO 97/24382 | 7/1997 |
| WO | WO9908136 A1 | 2/1999 |
| WO | WO9953347 | 10/1999 |
| WO | WO 01/18079 | 3/2001 |
| WO | WO0118078 A1 | 3/2001 |
| WO | WO0149240 A2 | 7/2001 |
| WO | WO 03/095171 | 11/2003 |
| WO | WO2004030715 A1 | 4/2004 |
| WO | WO 2004/058489 | 7/2004 |
| WO | WO 2006/068705 | 6/2006 |
| WO | WO 2006/130402 | 12/2006 |
| WO | WO2009015256 A2 | 1/2009 |

* cited by examiner

HIGH REFRACTIVE INDEX OPHTHALMIC DEVICE MATERIALS

This application claims priority to U.S. Provisional Application, U.S. Ser. No. 60/951,865 filed Jul. 25, 2007.

FIELD OF THE INVENTION

This invention relates to high refractive index polymers and their use in ophthalmic lenses, particularly intraocular lenses that can be inserted through small incisions.

BACKGROUND OF THE INVENTION

High refractive index acrylic materials are known for use in intraocular lenses (IOLs). For example, U.S. Pat. No. 5,290,892 discloses high refractive index acrylic materials suitable for use as IOL materials. The materials are foldable and thus capable of being inserted through small incisions. These acrylic materials contain, as principal components, two aryl acrylic monomers.

In some cases, foldable acrylic intraocular lenses develop "glistenings" or "vacuoles" when implanted in humans or soaked in water at physiological temperatures. These microvacuoles appear to be pockets of water approximately 1 μm or greater in diameter. Glistenings are often too small to be seen by the naked eye, but are sometimes observed using a slit-lamp. Although glistenings have no detrimental effect on the function or performance of IOLs made from acrylic materials, it is nevertheless cosmetically desirable to minimize or eliminate them.

Published U.S. Patent Application 2006/0275342 A1 discloses ophthalmic device materials, including IOL materials, containing less than 15% by weight of certain polymerizable surfactants. The polymerizable surfactants are poloxamers and poloxamines, which are generally available under the PLURONIC and TETRONIC tradenames. One advantage of adding such polymerizable surfactants as comonomers in forming polymeric devices is said to be changed or improved device surface properties, such as lipid or protein uptake. It was determined that the functionalized surfactants did not affect mechanical properties of the device materials as the addition of the polymerizable surfactants produced no real change in the modulus or tear strength (see Example 17 of 2006/0275342 A1). The surfactants are chemically modified to make them polymerizable as comonomers. When unmodified surfactants were incorporated into a hydrogel contact lens material during polymerization, it was noted that upon hydration the lenses would become cloudy. When methacrylated counterparts of the unmodified surfactants were used, however, optical clarity was maintained after hydration (see Example 16 and FIGS. 6-8 of 2006/0275342 A1).

SUMMARY OF THE INVENTION

This invention is directed to ophthalmic device materials that do not contain glistenings. The ophthalmic device materials comprise
a) two polymerizable monomers of the structure:

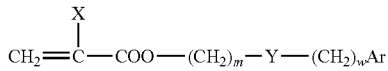

wherein:
X is H or $CH_3$;
m is 0-6;
Y is nothing, O, or $O(CH_2CH_2O)_n$;
n is 1-6;
w is 0-6, provided that m+w≦8; and
Ar is phenyl which can be unsubstituted or substituted with $CH_3$, $C_2H_5$, n-$C_3H_7$, iso-$C_3H_7$, $OCH_3$, $C_6H_{11}$, Cl, Br, $C_6H_5$, or $CH_2C_6H_5$;
b) a polymerizable cross-linking agent; and
c) a non-polymerizable propylene oxide-ethylene oxide-propylene oxide block copolymer surfactant having a molecular weight of approximately 3600 and an ethylene oxide unit content of approximately 40% by weight.

These device materials can be used to form intraocular lenses that have high refractive indexes, are flexible and transparent, can be inserted into the eye through a relatively small incision, and recover their original shape after having been inserted. Moreover, IOLs made from these materials are free or substantially free of glistenings compared to otherwise identical materials lacking the non-polymerizable surfactant.

Among other factors, the present invention is based upon the finding that the ophthalmic device materials obtained by copolymerizing two monomers of structure (I) and a cross-linking agent with a non-polymerizable propylene oxide-ethylene oxide-propylene oxide block copolymer surfactant having a molecular weight of approximately 3600 and an ethylene oxide unit content of approximately 40% are clear. Additionally, unlike when other propylene oxide-ethylene oxide-propylene oxide block copolymer surfactants are added to two monomers of structure (I) to obtain ophthalmic device materials, when a non-polymerizable propylene oxide-ethylene oxide-propylene oxide block copolymer surfactant having a molecular weight of approximately 3600 and an ethylene oxide unit content of approximately 40% by weight is added, the device materials are free or substantially free of glistenings.

DETAILED DESCRIPTION OF THE INVENTION

The ophthalmic device materials of the present invention comprise two monomers of the structure:

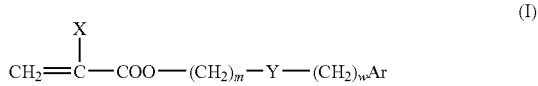

wherein:
X is H or $CH_3$;
m is 0-6;
Y is nothing, O, or $O(CH_2CH_2O)_n$;
n is 1-6;
w is 0-6, provided that m+w≦8; and
Ar is phenyl which can be unsubstituted or substituted with $CH_3$, $C_2H_5$, n-$C_3H_7$, iso-$C_3H_7$, $OCH_3$, $C_6H_{11}$, Cl, Br, $C_6H_5$, or $CH_2C_6H_5$.

Monomers of structure (I) can be made by methods known in the art. For example, the conjugate alcohol of the desired monomer can be combined in a reaction vessel with methyl methacrylate, tetrabutyl titanate (catalyst), and a polymerization inhibitor such as 4-benzyloxy phenol. The vessel can then be heated to facilitate the reaction and distill off the reaction by-products to drive the reaction to completion. Alternative synthesis schemes involve adding methacrylic acid to the conjugate alcohol and catalyzing with a carbodiimide or mixing the conjugate alcohol with methacryloyl chloride and a base such as pyridine or triethylamine.

Suitable monomers of structure (I) include, but are not limited to: 2-ethylphenoxy methacrylate; 2-ethylphenoxy acrylate; phenyl methacrylate; phenyl acrylate; benzyl methacrylate; benzyl acrylate; 2-phenylethyl methacrylate; 2-phenylethyl acrylate; 3-phenylpropyl methacrylate; 3-phenylpropyl acrylate; 4-phenylbutyl methacrylate; 4-phenylbutyl acrylate; 4-methylphenyl methacrylate; 4-methylphenyl acrylate; 4-methylbenzyl methacrylate; 4-methylbenzyl acrylate; 2-2-methylphenylethyl methacrylate; 2-2-methylphenylethyl acrylate; 2-3-methylphenylethyl methacrylate; 2-3-methylphenylethyl acrylate; 2-4-methylphenylethyl methacrylate; 2-4-methylphenylethyl acrylate; 2-(4-propylphenyl)ethyl methacrylate; 2-(4-propylphenyl)ethyl acrylate; 2-(4-(1-methylethyl)phenyl)ethyl methacrylate; 2-(4-(1-methylethyl)phenyl)ethyl acrylate; 2-(4-methoxyphenyl)ethyl methacrylate; 2-(4-methoxyphenyl)ethyl acrylate; 2-(4-cyclohexylphenyl)ethyl methacrylate; 2-(4-cyclohexylphenyl)ethyl acrylate; 2-(2-chlorophenyl)ethyl methacrylate; 2-(2-chlorophenyl)ethyl acrylate; 2-(3-chlorophenyl)ethyl methacrylate; 2-(3-chlorophenyl)ethyl acrylate; 2-(4-chlorophenyl)ethyl methacrylate; 2-(4-chlorophenyl)ethyl acrylate; 2-(4-bromophenyl)ethyl methacrylate; 2-(4-bromophenyl)ethyl acrylate; 2-(3-phenylphenyl)ethyl methacrylate; 2-(3-phenylphenyl)ethyl acrylate; 2-(4-phenylphenyl)ethyl methacrylate; 2-(4-phenylphenyl)ethyl acrylate; 2-(4-benzylphenyl)ethyl methacrylate; and 2-(4-benzylphenyl)ethyl acrylate.

Preferred monomers of structure (I) are those wherein m is 2-4, Y is nothing or O, and Ar is phenyl. Most preferred are 2-phenylethyl acrylate and 2-phenylethyl methacrylate.

The total amount of the monomers of structure (I) contained in the device materials of the present invention is generally about 75% by weight or more, and is preferably about 80-90% by weight, of the total amount of polymerizable components of the ophthalmic device materials.

The ophthalmic device materials of the present invention also contain a polymerizable cross-linking agent. The cross-linking agent may be any terminally ethylenically unsaturated compound having more than one unsaturated group. Suitable cross-linking agents include, for example: ethylene glycol dimethacrylate, diethylene glycol dimethacrylate, allyl methacrylate, 1,3-propanediol dimethacrylate, 1,6-hexanediol dimethacrylate, 1,4-butanediol dimethacrylate, and their corresponding acrylates. Preferred cross-linking agents are ethylene glycol dimethacrylate (EGDMA) and 1,4-butanediol diacrylate (BDDA). In general, the amount of any cross-linking agent used in the device materials of the present invention will be 10% by weight or less, preferably 5% by weight or less, of the polymerizable components of the ophthalmic device materials. In preferred embodiments, the device materials of the present invention comprise a cross-linking agent in an amount of 0.2-5% by weight. In even more preferred embodiments, the device materials of the present invention comprise a cross-linking agent in an amount of 2-5% by weight.

In addition to two monomers of structure (I), the copolymers of the present invention also contain a non-polymerizable propylene oxide-ethylene oxide-propylene oxide block copolymer surfactant having a molecular weight of approximately 3600 and an ethylene oxide unit content of approximately 40% by weight. Such a surfactant is commercially available from BASF under the tradename Pluronic® 25R4. The amount of Pluronic 25R4 contained in the ophthalmic device materials of the present invention is generally 2-20% by weight, and is preferably 4.5-10.5% by weight.

The proportions of the monomers to be included in the copolymers of the present invention should be chosen so that the copolymer has a glass transition temperature ($T_g$) not greater than about 37° C., which is normal human body temperature. Copolymers having glass transition temperatures higher than 37° C. are not suitable for use in foldable IOLs; such lenses could only be rolled or folded at temperatures above 37° C. and would not unroll or unfold at normal body temperature. It is preferred to use copolymers having a glass transition temperature somewhat below normal body temperature and no greater than normal room temperature, e.g., about 20-25° C., in order that IOLs made of such copolymers can be rolled or folded conveniently at room temperature. $T_g$ is measured by differential scanning calorimetry at 10° C./min., and is determined at the midpoint of the transition of the heat flux curve.

For IOLs and other applications, the materials of the present invention must exhibit sufficient strength to allow devices made of them to be folded or manipulated without fracturing. Thus the copolymers of the present invention will have an elongation of at least 80%, preferably at least 100%, and most preferably between 110 and 200%. This property indicates that lenses made of such materials generally will not crack, tear or split when folded. Elongation of polymer samples is determined on dumbbell shaped tension test specimens with a 20 mm total length, length in the grip area of 4.88 mm, overall width of 2.49 mm, 0.833 mm width of the narrow section, a fillet radius of 8.83 mm, and a thickness of 0.9 mm. Testing is performed on samples at ambient conditions using an Instron Material Tester (Model No. 4442 or equivalent) with a 50 Newton load cell. The grip distance is set at 14 mm and a crosshead speed is set at 500 mm/minute and the sample is pulled until failure. The elongation (strain) is reported as a fraction of the displacement at failure to the original grip distance. Since the materials to be tested are essentially soft elastomers, loading them into the Instron machine tends to make them buckle. To remove the slack in the material sample a pre-load is placed upon the sample. This helps to reduce the slack and provide a more consistent reading. Once the sample is pre-loaded to a desired value (typically 0.03 to 0.05 N) the strain is set to zero and the test begun.

IOLs made of the ophthalmic device materials of the present invention are free or substantially free of glistenings when measured according to the following test ("the Glistening Test"). The presence of glistenings is measured by placement of a lens or disk sample into a vial and adding deionized water or a balanced salt solution. The vial is then placed into a water bath preheated to 45° C. Samples are to be maintained in the bath for 24±2 hours. The vial is then removed from the water bath and allowed to equilibrate at room temperature for 2±0.5 hours. The sample is removed from the vial and placed on a microscope slide. The sample is inspected visually in various on angle or off angle lighting to evaluate clarity. Visualization of glistenings is done with light microscopy using a magnification of 50 to 200×. A sample is judged to be free of glistenings if, at 50-200× magnification, the number of glistenings detected in the eyepiece is zero. A sample is judged to be substantially free of glistenings if, at 50-200× magnification, the number of glistenings detected in the eyepiece is less than about 2/mm$^3$. It is often very difficult to detect glistenings, so the sample is rastered throughout the entire volume of the lens, varying the magnification levels (50-200×), the aperture iris diaphragm, and the field conditions (using both bright field and dark field conditions) in an attempt to detect the presence of glistenings.

An ultra-violet absorbing material can also be included in the materials of the present invention. The ultraviolet absorbing material can be any compound which absorbs ultraviolet light, i.e., light having a wavelength shorter than about 400 nm, but does not absorb any substantial amount of visible light. The ultraviolet absorbing compound is incorporated into the monomer mixture and is entrapped in the polymer matrix when the monomer mixture is polymerized. Suitable ultraviolet absorbing compounds include substituted benzophenones, such as 2-hydroxybenzophenone, and 2-(2-hydroxyphenyl)benzotriazoles. It is preferred to use an ultraviolet absorbing compound which is copolymerizable with the monomers and is thereby covalently bound to the polymer matrix. In this way possible leaching of the ultraviolet absorbing compound out of the lens and into the interior of the eye is minimized. Suitable copolymerizable ultraviolet absorbing compounds are the substituted 2-hydroxybenzophenones disclosed in U.S. Pat. No. 4,304,895 and the 2-hydroxy-5-acryloxyphenyl-2H-benzotriazoles disclosed in U.S. Pat. No. 4,528,311. The most preferred ultraviolet absorbing compound is 2-(2'-hydroxy-3'-methallyl-5'-methyl phenyl) benzotriazole.

In addition to ultraviolet absorbing materials, ophthalmic devices made of the copolymers of the present invention may include colored dyes, such as the yellow dyes disclosed in U.S. Pat. No. 5,470,932.

The copolymers of this invention are prepared by conventional polymerization methods. For example, a mixture of the liquid monomers of structure (I) and a cross-linking agent in the desired proportions, together with the non-polymerizable surfactant, a UV absorber, a yellow dye, and a conventional thermal free-radical initiator, is prepared. The mixture can then be introduced into a mold of desired shape, and the polymerization carried out by heating to activate the initiator. Typical thermal free radical initiators include peroxides, such as benzoyl peroxide, peroxycarbonates, such as bis-(4-t-butylcyclohexyl) peroxydicarbonate, azonitriles, such as azobisisobutyronitrile, and the like. A preferred initiator is bis-(4-t-butylcyclohexyl) peroxydicarbonate (PERK). Alternatively, the monomers can be photopolymerized by using a mold which is transparent to actinic radiation of a wavelength capable of initiating polymerization of these acrylic monomers by itself. Conventional photoinitiator compounds, e.g., a benzophenone-type photoinitiator, can also be introduced to facilitate the polymerization.

Once the ophthalmic device materials of the present invention have been cured, they are extracted in a suitable solvent to remove as much of the unreacted components of the materials as possible. Examples of suitable solvents include acetone, methanol, and cyclohexane. A preferred solvent for extraction is acetone.

IOLs constructed of the disclosed ophthalmic device materials can be of any design capable of being rolled or folded into a small cross section that can fit through a relatively smaller incision. For example, the IOLs can be of what is known as a one piece or multipiece design. Typically, an IOL comprises an optic and at least one haptic. The optic is that portion which serves as the lens and the haptics are attached to the optic and are like arms which hold the optic in its proper place in the eye. The optic and haptic(s) can be of the same or different material. A multipiece lens is so called because the optic and the haptic(s) are made separately and then the haptics are attached to the optic. In a single piece lens, the optic and the haptics are formed out of one piece of material. Depending on the material, the haptics are then cut, or lathed, out of the material to produce the IOL.

In addition to IOLs, the ophthalmic device materials of the present invention are also suitable for use in other devices, including contact lenses, keratoprostheses, intracorneal lenses, corneal inlays or rings, and glaucoma filtration devices.

The invention will be further illustrated by the following examples which are intended to be illustrative, but not limiting.

Example 1

A stock lens solution containing 65% 2-phenylethyl acrylate, 30% 2-phenylethyl methacrylate, 3.2% 1,4-butanediol diacrylate, 1.8% o-methallyl Tinuvin P, and 1.8% Perkadox 16 was prepared. The lens formulations shown below in Table 1 were prepared by combining the indicated amounts of the stock lens solution with the indicated amounts of non-polymerizable Pluronic 25R4. The resulting formulation was added to slab molds and cured in a forced air oven at 70-80° C. for 1 hr then ramp to 100-110° C. and held there for 2 hours and after curing, the slabs were extracted (bulk) in the indicated solvents, tested for glistening (vacuoles) using the test described above, inspected to determine whether they were clean or hazy, and analyzed to determine equilibrium water content at 35° C. The results are shown in Table 1.

TABLE 1

| Formulation No. | Stock Lens Solution (%) | Pluronic 25R4 (%) | Solvent Extraction | Extracts (%) | Vacuoles | Clarity | 35° C. EWC (%) |
| --- | --- | --- | --- | --- | --- | --- | --- |
| 1 | 90 | 10 | None | — | None | Clear | — |
| 2 | 90 | 10 | Methanol | 2.80 | None | Clear | 2.80 |
| 3 | 90 | 10 | Cyclohexane | 3.03 | None | Clear | 2.37 |
| 4 | 90 | 10 | Acetone | 9.24 | None | Clear | 0.71 |

Example 2

The lens formulations shown in Table 2 were prepared and cured according to the procedure described in Example 1. All cured slabs were subjected to soxhlet acetone extraction with a desired number of cycles. In addition to the tests conducted in Example 1, refractive index was also measured. The results are shown in Table 2

TABLE 2

| Formulation No. | Stock Lens Solution | Pluronic 25R4 | # Soxhlet Extraction Cycles | Extracts % | Vacuoles | Clarity | 35° C. EWC (%) | Refractive Index |
|---|---|---|---|---|---|---|---|---|
| 5 | 90.01 | 9.99 | 5 | 5.37 | None | Clear | 1.91 | 1.526 |
| 6 | 90.01 | 9.99 | 10 | 7.52 | None | Clear | 1.34 | 1.534 |
| 7 | 90.01 | 9.99 | 15 | 8.18 | None | Clear | 1.08 | 1.537 |
| 8 | 90.01 | 9.99 | 20 | 8.52 | None | Clear | 0.97 | 1.538 |
| 9 | 90.01 | 9.99 | 25 | 8.75 | None | Clear | 0.93 | 1.538 |

Example 3

The lens formulations shown in Table 3 were prepared and cured in a manner similar to Example 1. The formulations were subjected to either a one-state or two-stage acetone extraction process where the first stage was soxhlet extraction and the second stage was simple (static) extraction. Vacuole testing and clarity inspections were conducted as shown and equilibrium water content was determined. The results are shown in Table 3. For Examples 3-9, the quantity of vacuoles present in a sample was not determined by any measurements or counting, but a rough estimate of the number of vacuoles observed was noted using the following hierarchy: full>some>few>none.

TABLE 3

| Formulation No. | Stock Lens Solution | Pluornic 25R4 | Extraction Condition | Extracts (%) | Vacuoles Pre-Extraction | Clarity Pre-Extraction | Vacuoles Post-Extraction | Clarity Post Extraction | 35° C. EWC % |
|---|---|---|---|---|---|---|---|---|---|
| 10 | 100 | 0 | Soxh. | 2.09 | Yes (full) | Clear | Yes (full) | Very slight haze | 0.32 |
| 11 | 100 | 0 | Soxh./static | 2.21 | — | — | Yes (full) | Slight haze | 0.32 |
| 12 | 97.23 | 2.77 | Soxh. | 3.64 | None | Clear | * | Clear | 0.43 |
| 13 | 97.23 | 2.77 | Soxh./static | 3.88 | — | — | Yes, but less than control | Clear | 0.39 |
| 14 | 95.03 | 4.97 | Soxh. | 5.04 | None | Clear | * | Clear | 0.55 |
| 15 | 95.03 | 4.97 | Soxh./static | 5.46 | — | — | None | Clear | 0.44 |
| 16 | 92.34 | 7.66 | Soxh. | 7.10 | None | Clear | * | Clear | 0.67 |
| 17 | 92.34 | 7.66 | Soxh./static | 7.39 | — | — | None | Clear | 0.60 |
| 18 | 89.86 | 10.14 | Soxh. | 9.07 | None | Clear | None | Clear | 0.79 |
| 19 | 89.86 | 10.14 | Soxh./static | 9.32 | — | — | None | Clear | 0.81 |

* Very few spots; not immediately recognized as vacuoles.

Example 4

The lens formulations shown in Table 4 were prepared and cured in a manner similar to Example 1. The cured slabs were bulk extracted in acetone followed by methylene chloride as indicated. The samples were tested for vacuoles, inspected for clarity and equilibrium water content at 35° C. was determined. The results are shown in Table 4.

TABLE 4

| Formulation No. | Stock Lens Solution (%) | Pluronic 25R4 (%) | Solvent Extraction | Extracts (%) | Vaculoes | Clarity | 35° C. EWC (%) |
|---|---|---|---|---|---|---|---|
| 20 | 100 | 0 | Acetone | 2.16 | Yes (full) | Slight haze | 0.38 |
| 21 | 94.93 | 5.07 | Acetone | 5.37 | None | Clear | 0.50 |
| 22 | 92.24 | 7.76 | Acetone | 7.37 | None | Clear | 0.56 |
| 23 | 89.90 | 10.10 | Acetone | 9.24 | None | Clear | 0.79 |
| 24 | 100 | 0 | $CH_2Cl_2$ | 2.24 | Yes (full) | Slight haze | 0.35 |
| 25 | 94.93 | 5.07 | $CH_2Cl_2$ | 6.09 | None | Clear | 0.51 |
| 26 | 92.24 | 7.76 | $CH_2Cl_2$ | 7.64 | None | Clear | 0.62 |
| 27 | 89.90 | 10.10 | $CH_2Cl_2$ | 9.51 | None | Clear | 0.72 |

Example 5

The lens formulations shown in Table 5 were prepared and cured in a manner similar to Example 1. The slabs were bulk extracted in acetone, tested for vacuoles and equilibrium water content at 35° C. was determined. The results are shown in Table 5.

TABLE 5

| Formulation No. | Stock Lens Solution (%) | Pluronic 25R4 | Extracts % | Vacuoles | 35° C. EWC (%) |
|---|---|---|---|---|---|
| 28 | 97.01 | 2.99 | 4.00 | Yes (Some) | 0.46 |
| 29 | 95.92 | 4.08 | 4.77 | Yes (Few) | 0.43 |
| 30 | 95.11 | 4.89 | 5.27 | None | 0.40 |
| 31 | 93.92 | 6.08 | 6.17 | None | 0.45 |

Example 6

The lens formulation shown in Table 6 were prepared and cured in a manner similar to Example 1. The cured slabs were bulk extracted in acetone. The slabs were then tested for vacuoles and equilibrium water content at 35° C. was determined. The results are shown in Table 6.

TABLE 6

| Formulation No. | Stock Lens Solution (%) | Pluronic (Type) | Pluronic (%) | Extracts (%) | Vacuoles | 35° C. EWC (%) |
|---|---|---|---|---|---|---|
| 32 | 100 | — | 0 | 2.04 | Yes (Full) | 0.27 |
| 33 | 90 | L31 | 10 | 11.26 | Yes (Full) | 0.31 |
| 34 | 90 | 10R5 | 10 | 10.56 | Yes (Some) | 0.33 |

Example 7

The lens formulations shown in Table 7 were prepared and cured in a manner similar to Example 1. The cured slabs were extracted (bulk) in acetone, tested for vacuoles, inspected for clarity, and equilibrium water content at 35° C. was determined. The results are shown in Table 7.

TABLE 7

| Formulation No. | Stock Lens Solution (%) | Pluronic (type) | Pluronic (%) | Extracts (%) | Vacuoles | Clarity | 35° C. EWC (%) |
|---|---|---|---|---|---|---|---|
| 35 | 89.91 | P84 | 10.09 | 9.01 | Yes (full) | Hazy | 1.24 |
| 36 | 90.02 | P104 | 9.98 | 8.25 | Yes (full) | Clear | 1.50 |
| 37 | 90.00 | F87 | 10.00 | 7.35 | Yes (full) | Clear | 2.72 |
| 38 | 89.99 | F88 | 10.01 | <Not soluble> | — | — | — |

Example 8

The lens formulations shown in Table 8 were prepared and cured in a manner similar to Example 1. The cured slabs were bulk extracted in acetone, tested for vacuoles, inspected for clarity, and equilibrium water content at 35° C. was determined. All samples were also subjected to mechanical property testing to determine tensile strength, strain, and Young's modulus. The results are shown in Table 8.

TABLE 8

| Formulation No. | Stock Lens Solution (%) | Pluonic (Type) | Pluronic (%) | Extracts (%) | Vacuoles | Clarity | 35° C. EWC (%) | Tensile Strength (MPa) | Strain (%) | Young's Modulus (MPa) |
|---|---|---|---|---|---|---|---|---|---|---|
| 39 | 90 | L43 | 10 | 10.4 | Yes (full) | Slight haze | 0.5 | 7.48 | 127.9 | 54.4 |
| 40 | 90 | L61 | 10 | 10.0 | Yes (full) | Slight haze | 0.4 | 7.61 | 129.2 | 52.1 |
| 41 | 90 | L64 | 10 | 10.3 | Yes (full) | Clear | 0.5 | 7.81 | 138.6 | 44.28 |
| 42 | 90 | L81 | 10 | 10.0 | Yes (full) | Slight haze | 0.4 | 7.62 | 136.6 | 47.56 |
| 43 | 90 | L92 | 10 | 9.5 | Yes (full) | Slight haze | 0.7 | 6.66 | 129.7 | 41.07 |
| 44 | 90 | L101 | 10 | 9.6 | Yes (full) | Hazy | 0.7 | 6.57 | 127.3 | 45.08 |
| 45 | 90 | 17R2 | 10 | 10.3 | Yes (full) | Hazy | 0.5 | 6.9 | 136.7 | 42.32 |
| 46 | 90 | 17R4 | 10 | 10.3 | Yes (some) | Hazy | 1.2 | 6.66 | 132.9 | 39.27 |
| 47 | 90 | 25R2 | 10 | 10.2 | Yes (full) | Hazy | 1.2 | 6.15 | 128.7 | 37.5 |
| 48 | 90 | 31R1 | 10 | 9.7 | Yes (full) | Hazy | 0.9 | 6.76 | 133.4 | 39.82 |
| 49 | 90 | P104 | 10 | 8.4 | Yes (full) | Clear | 1.4 | 4.77 | 122 | 18.69 |

Example 9

The lens formulations shown in Table 9 were prepared and cured in a manner similar to Example 1. The cured slabs were bulk extracted in acetone, tested for vacuoles and equilibrium water content at 35° C. The samples were also subjected to mechanical property testing to determine stress, strain and Young's modulus values. The results are shown in Table 9.

TABLE 9

| | FORMULATION NO. | | | | | | | | | | |
|---|---|---|---|---|---|---|---|---|---|---|---|
| | 50 | 51 | 52 | 53 | 54 | 55 | 56 | 57 | 58 | 59 | 60 |
| PEA | 89.52 | 88.28 | 86.70 | 86.41 | 83.35 | 84.51 | 81.80 | 81.43 | 78.29 | 79.49 | 65.0 |
| PEMA | 9.96 | 9.98 | 10.10 | 12.47 | 14.91 | 14.97 | 15.06 | 17.49 | 19.95 | 19.97 | 30.0 |
| BDDA | 0.52 | 1.74 | 3.20 | 1.12 | 1.74 | 0.52 | 3.15 | 1.08 | 1.76 | 0.54 | 3.20 |
| Pluronic 25R4 | 9.22 | 9.19 | 9.14 | 9.17 | 9.07 | 9.12 | 9.11 | 9.10 | 9.06 | 9.42 | — |
| Perkadox 16S | 2.00 | 2.00 | 2.01 | 2.00 | 1.99 | 1.99 | 2.01 | 1.99 | 2.01 | 2.00 | 1.80 |
| Extracts (%) | 10.04 | 8.71 | 7.67 | 8.90 | 8.59 | 9.77 | 7.55 | 8.93 | 8.51 | 9.98 | 2.00 |
| Vacuoles | None | None | None | None | None | None | None | None | None | None | Yes (Full) |
| 35° C. EWC | 0.63 | 0.60 | 0.84 | 0.52 | 0.66 | 0.58 | 0.83 | 0.53 | 0.50 | 0.57 | 0.35 |
| Stress (MPa) | 3.59 | 4.00 | 2.79 | 4.34 | 4.49 | 3.61 | 3.79 | 4.64 | 5.14 | 4.63 | 8.65 |
| Strain (%) | 297 | 166 | 102 | 214 | 167 | 291 | 113 | 216 | 169 | 299 | 100 |
| Young's Modulus (MPa) | 3.17 | 4.06 | 5.03 | 4.08 | 4.79 | 4.02 | 6.44 | 5.23 | 6.1 | 5.35 | 68.8 |

Example 10

The formulations shown in Table 9 were tested for microvacuoles five days after they were prepared and the results are shown in Table 10. All samples were vacuole-free. The samples were stored in water at room temperature for one year and then visually inspected. These results are also shown in Table 10.

TABLE 10

| | FORMULATION NO. | | | | | | | | | | |
|---|---|---|---|---|---|---|---|---|---|---|---|
| | 60 | 50 | 55 | 59 | 57 | 53 | 51 | 54 | 58 | 56 | 52 |
| X-linker concentration | 3.20 | 0.52 | 0.52 | 0.54 | 1.08 | 1.12 | 1.74 | 1.74 | 1.76 | 3.15 | 3.20 |
| Vacuoles @ 5 days | Yes (Full) | None | None | None | None | None | None | None | None | None | None |
| Visual Inspection @ 1 year | — | Haze | Haze | Haze | Haze | Haze | Haze | Haze | Haze | Clear | Clear |

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. An ophthalmic device material comprising
a) two polymerizable monomers of structure (I):

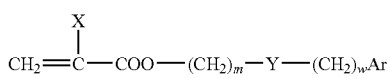

wherein:
X is H or $CH_3$;
m is 0-6;
Y is nothing, O, or $O(CH_2CH_2O)_n$;
n is 1-6;
w is 0-6, provided that m+w≦8; and
Ar is phenyl which can be unsubstituted or substituted with $CH_3$, $C_2H_5$, n-$C_3H_7$, iso-$C_3H_7$, $OCH_3$, $C_6H_{11}$, Cl, Br, $C_6H_5$, or $CH_2C_6H_5$; and
b) a polymerizable cross-linking agent; and
c) 2-20% by weight of a non-polymerizable propylene oxide-ethylene oxide-propylene oxide block copolymer surfactant having a molecular weight of approximately 3600 and an ethylene oxide unit content of approximately 40% by weight.

2. The ophthalmic device material of claim 1 wherein the monomers of structure (I) are selected from the group consisting of: 2-ethylphenoxy methacrylate; 2-ethylphenoxy acrylate; phenyl methacrylate; phenyl acrylate; benzyl methacrylate; benzyl acrylate; 2-phenylethyl methacrylate; 2-phenylethyl acrylate; 3-phenylpropyl methacrylate; 3-phenylpropyl acrylate; 4-phenylbutyl methacrylate; 4-phenylbutyl acrylate; 4-methylphenyl methacrylate; 4-methylphenyl acrylate; 4-methylbenzyl methacrylate; 4-methylbenzyl acrylate; 2-2-methylphenylethyl methacrylate; 2-2-methylphenylethyl acrylate; 2-3-methylphenylethyl methacrylate; 2-3-methylphenylethyl acrylate; 2-4-methylphenylethyl methacrylate; 2-4-methylphenylethyl acrylate; 2-(4-propylphenyl)ethyl methacrylate; 2-(4-propylphenyl)ethyl acrylate; 2-(4-(1-methylethyl)phenyl)ethyl methacrylate; 2-(4-(1-methylethyl)phenyl)ethyl acrylate; 2-(4-methoxyphenyl) ethyl methacrylate; 2-(4-methoxyphenyl)ethyl acrylate; 2-(4-cyclohexylphenyl)ethyl methacrylate; 2-(4-cyclohexylphenyl)ethyl acrylate; 2-(2-chlorophenyl)ethyl methacrylate; 2-(2-chlorophenyl)ethyl acrylate; 2-(3-chlorophenyl) ethyl methacrylate; 2-(3-chlorophenyl)ethyl acrylate; 2-(4-chlorophenyl)ethyl methacrylate; 2-(4-chlorophenyl)ethyl acrylate; 2-(4-bromophenyl)ethyl methacrylate; 2-(4-bromophenyl)ethyl acrylate; 2-(3-phenylphenyl)ethyl methacrylate; 2-(3-phenylphenyl)ethyl acrylate; 2-(4-phenylphenyl) ethyl methacrylate; 2-(4-phenylphenyl)ethyl acrylate; 2-(4-benzylphenyl)ethyl methacrylate; and 2-(4-benzylphenyl) ethyl acrylate.

3. The ophthalmic device material of claim 1 wherein m is 2-4, Y is nothing or O, and Ar is phenyl.

4. The ophthalmic device material of claim 3 wherein the two monomers of structure (I) are 2-phenylethyl acrylate and 2-phenylethyl methacrylate.

5. The ophthalmic device material of claim 1 wherein the amount of non-polymerizable propylene oxide-ethylene oxide-propylene oxide block copolymer surfactant is 4.5-10.5% by weight.

6. The ophthalmic device material of claim 1 wherein the polymerizable cross-linking agent is selected from the group consisting of: ethylene glycol dimethacrylate; diethylene glycol dimethacrylate; allyl methacrylate; 1,3-propanediol dimethacrylate; 1,6-hexanediol dimethacrylate; 1,4-butanediol dimethacrylate; and their corresponding acrylates.

7. The ophthalmic device material of claim 1 wherein the polymerizable cross-linking agent is present in an amount of 0.2-0.5% by weight.

8. The ophthalmic device material of claim 1 wherein the polymerizable cross-linking agent is present in an amount of 2-5% by weight.

9. The ophthalmic device material of claim 1 further comprising an ultraviolet absorbing compound.

10. The ophthalmic device material of claim 1 further comprising a yellow dye.

11. An ophthalmic device comprising the ophthalmic device material of claim 1, wherein the ophthalmic device is selected from the group consisting of: intraocular lenses; contact lenses; keratoprostheses; intracorneal lenses; corneal inlays or rings; and glaucoma filtration devices.

* * * * *